US009145176B1

(12) United States Patent
Van Wyk et al.

(10) Patent No.: US 9,145,176 B1
(45) Date of Patent: Sep. 29, 2015

(54) VEHICLE BOX REINFORCING BRACE

(71) Applicant: FORD GLOBAL TECHNOLOGIES, LLC, Dearborn, MI (US)

(72) Inventors: Philip Van Wyk, Burien, WA (US); Jeffrey Alan Firzlaff, Royal Oak, MI (US); Vincent Chimento, Plymouth, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/317,317

(22) Filed: Jun. 27, 2014

(51) Int. Cl.
*B62D 33/02* (2006.01)
*B62D 33/077* (2006.01)
*B62D 29/00* (2006.01)

(52) U.S. Cl.
CPC ............ *B62D 33/077* (2013.01); *B62D 29/008* (2013.01); *B62D 33/02* (2013.01)

(58) Field of Classification Search
CPC ........ B62D 21/02; B62D 21/03; B62D 21/18; B62D 24/00; B62D 24/02; B62D 24/04; B62D 33/02
USPC ................... 296/182.1, 183.1, 184.1, 187.08, 296/187.11, 193.07, 193.08, 203.03, 204, 296/29, 30
See application file for complete search history.

(56) References Cited

U.S. PATENT DOCUMENTS

| 2,561,098 | A | * | 7/1951 | Cole | 296/182.1 |
| 2,978,153 | A | * | 4/1961 | Brindle | 224/541 |
| 3,897,972 | A | * | 8/1975 | Logue | 296/183.1 |
| 3,909,059 | A | * | 9/1975 | Benninger et al. | 296/184.1 |
| 4,266,465 | A | * | 5/1981 | Gaun et al. | 91/234 |
| 4,817,537 | A | * | 4/1989 | Cripe et al. | 105/404 |
| 5,222,694 | A | | 6/1993 | Smoot | |
| 5,411,311 | A | | 5/1995 | Shimmell et al. | |
| 6,073,993 | A | | 6/2000 | Iwatsuki et al. | |
| 6,960,055 | B2 | * | 11/2005 | Musso et al. | 414/528 |
| 7,273,230 | B2 | | 9/2007 | Kiel et al. | |
| 8,162,334 | B2 | | 4/2012 | Kondou et al. | |
| 8,702,126 | B2 | | 4/2014 | Golden et al. | |
| 8,876,160 | B2 | * | 11/2014 | Olson et al. | 280/781 |
| 2003/0001409 | A1 | * | 1/2003 | Semple et al. | 296/183 |
| 2007/0085381 | A1 | * | 4/2007 | Delaney et al. | 296/193.08 |
| 2008/0277969 | A1 | * | 11/2008 | Sato | 296/193.08 |
| 2009/0160216 | A1 | * | 6/2009 | Gosselin et al. | 296/184.1 |
| 2011/0031778 | A1 | * | 2/2011 | Edwards et al. | 296/183.1 |
| 2011/0047772 | A1 | * | 3/2011 | Gosselin et al. | 29/401.1 |
| 2012/0205942 | A1 | * | 8/2012 | Castillo | 296/184.1 |
| 2014/0130658 | A1 | * | 5/2014 | Gonzalez | 89/36.08 |
| 2014/0284964 | A1 | * | 9/2014 | Booher | 296/184.1 |

* cited by examiner

*Primary Examiner* — Gregory Blankenship
(74) *Attorney, Agent, or Firm* — Raymond L. Coppiellie; Brooks Kushman P.C.

(57) ABSTRACT

A vehicle includes a frame having a pair of longitudinal rails and a box. The box includes a bed supported by the rails and a pair of opposing sidewalls connected to the bed outboard of the rails. A pair of braces provide additional support between the bed and the frame rails. Each may be attached between respective rails and a bottom portion of the bed outboard the rails.

18 Claims, 3 Drawing Sheets

US 9,145,176 B1

VEHICLE BOX REINFORCING BRACE

TECHNICAL FIELD

The present application relates to assemblies for reinforcing pickup truck boxes and components thereof.

BACKGROUND

Vehicles, such as pickup trucks, may include a box having a bed, opposing sidewalls, a headboard and a tailgate. The box is attached to and supported by the chassis. The box may be equipped with toolboxes, ladder racks, tie-downs and other equipment that exert equipment loads on the box. These loads are transferred from the box to the chassis through the bed.

Traditionally, the majority of body structures on pickup trucks are steel alloys. Through years of experience, pickup truck designers have learned how to engineer steel truck body parts that withstand the variety of demanding pickup truck applications. The current regulatory and economic environment have increased the importance of making pickup trucks more fuel efficient as well as functional and durable.

This increased emphasis on fuel efficiency has led to a desire for lightweight vehicle components, such as aluminum alloy vehicle components. Aluminum alloys typically have a higher strength to weight ratio than steel alloys. Consequently, replacing steel with aluminum offers potential for weight reduction. Steel alloys and aluminum alloys may have different material properties. The difference material properties may require different design solutions in addition to material substitution.

SUMMARY

According to one embodiment, a pickup truck includes a frame having a pair of longitudinal rails. A box is supported by the rails. A box includes a bed and a pair of opposing sidewalls connected to the bed outboard of the rails. A pair of braces are attached between respective rails and respective bottom portions of the bed outboard the rails.

According to another embodiment, a vehicle includes a frame and a box supported by the frame. The box has a pair of opposing sidewalls interconnected at a front end by a headboard, and pair of pillars. Each pillar is disposed in one of the sidewalls at a rear portion of the sidewalls. Each pillar has a bottom end. A rear sill is attached between the pillars at the bottom end, and is supported by the frame. A tailgate is pivotally attached between the pillars. A pair of braces each include first and second ends. Each brace is attached to the frame at a first end and is attached to one of the rear sill and a respective pillar at the second end to prevent the pillars from deflecting when a load is applied to the sidewall to ensure proper alignment between the tailgate and the pillars.

According to yet another embodiment, a brace for a pickup truck includes a box supported by a frame. The box has a pillar disposed in a sidewall of the box. The pillar is supported by a rear sill that is attached to the frame. The brace includes an elongated body having a first end attached to the frame and a second end attached to one of the pillar and the rear sill. The brace is configured to prevent the rear sill from bending when a load is applied to the sidewall.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
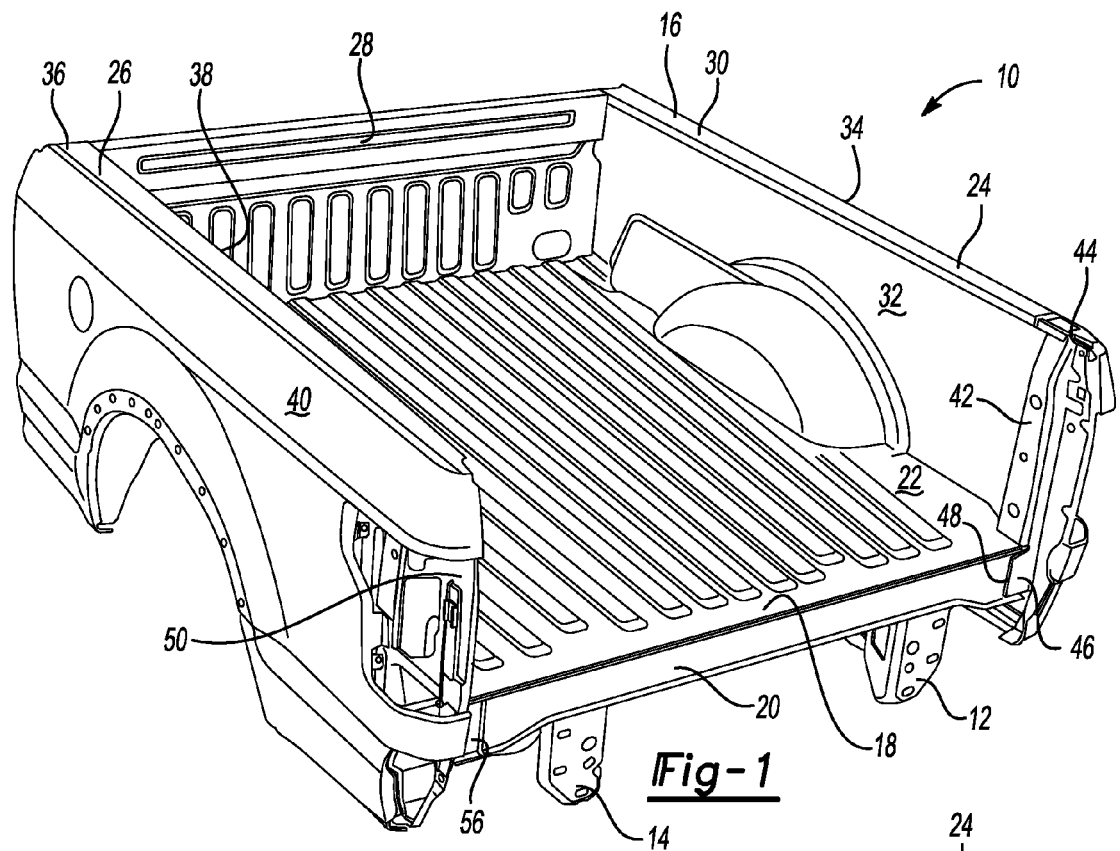
FIG. 1 is a rear perspective view of a vehicle with a tailgate removed.
Figure 2:
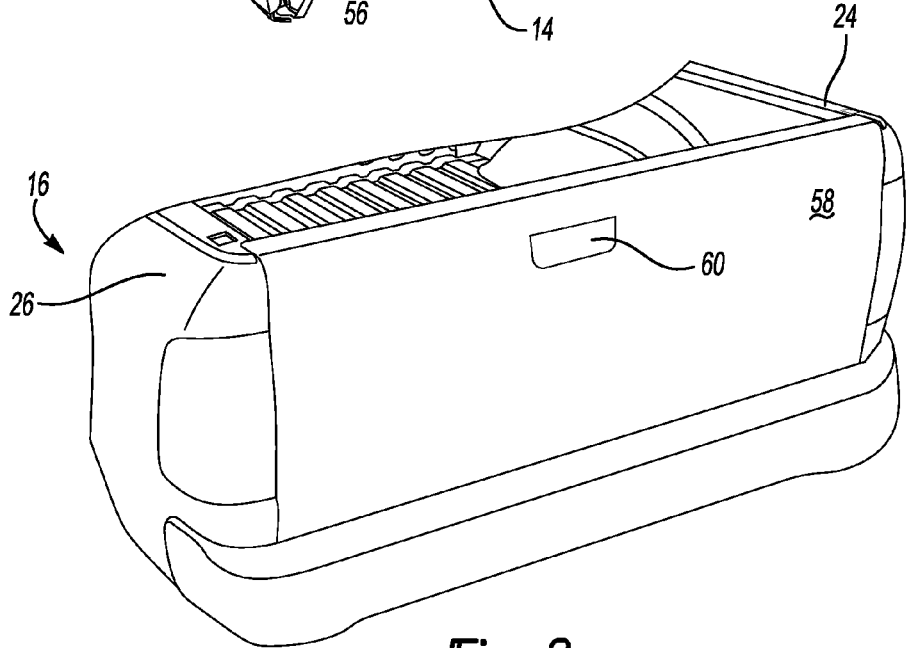
FIG. 2 is a rear perspective view of a vehicle with the tailgate attached.

FIGS. 1 and 2 illustrate rear portions of a pickup truck 10. The pickup truck 10 includes a frame having a first longitudinal frame rail 12 and a second longitudinal frame rail 14. The pickup truck 10 also includes a box 16 that is supported by the first and second frame rails 12, 14. The box 16 may include a bed 18 having lateral support structures that are attached to the first frame rail 12 and the second frame rail 14 at a lower surface of the lateral support structures.

The bed 18 also includes a rear sill 20 that defines a lower rear end of the bed 18. The rear sill 20 may be attached to the first frame rail 12 and the second frame rail 14 at a lower surface of the rear sill. The rear sill 20 may be made of an aluminum alloy, such as 6000-series aluminum alloy. The bed 18 also has a floor surface 22 that may be attached to a top surface of the lateral support structures and a top surface of the rear sill 20. The lateral support structures and the rear sill 20 support the floor surface 22 and transfer loads from the floor surface 22 to the frame rails 12, 14. The box 16 also includes a first sidewall 24 attached along a first longitudinal side of the bed 18 and a second sidewall 26 attached along a second longitudinal side of the bed 18. A headboard 28 is connected between the first and second sidewalls 24, 26 at a front portion of the box 16 near the cab.

The first sidewall includes a top surface 30, an inner wall 32, and an outer wall 34. The first sidewall 24 also includes a first pillar 42 that is disposed between the inner wall 32 and the outer wall 34. The pillar includes a top end 44 and a bottom end 46. The bottom end 46 is attached to the rear sill 20 forming a first joint 48. The first pillar 42 transfers loads from the first sidewall 24 into the rear sill 20 through the first joint 48.

The second sidewall 26 includes a top surface 36, an inner wall 38 and an outer wall 40. The second sidewall 26 also includes a second pillar 50 that is disposed between the inner sidewall 38 and the outer sidewall 40. The second pillar 50 includes a top end and a bottom end. The bottom end is attached to the rear sill 20 forming a second joint 56. The second pillar 50 transfers loads from the second sidewall 26 into the rear sill 20 through the second joint 56. The pillars may be made out of aluminum alloy.

The truck 10 also includes a tailgate 58 that is pivotally attached to a rear end of the box 16 between the first sidewall 24 and the second sidewall 26. The tailgate 58 includes a pair of opposing sides that may each include a lower pin. Each lower pin may be received in a corresponding sleeve in one of the first and second pillars 42, 50. The tailgate 58 pivots between an open position and a closed position along the lower pins and sleeves. Each tailgate sidewall may also include a latch disposed at an upper portion of the sidewall. The latch may cooperate with a corresponding locking post connected to one of the first and second pillars 42, 50. The latch and the locking post may engage each other to secure the tailgate 58 in the closed position. The tailgate 58 also includes a handle 60 that may cooperate with the latches to disengage the latches from the locking posts so that the tailgate 58 can be opened.

Figure 3A:
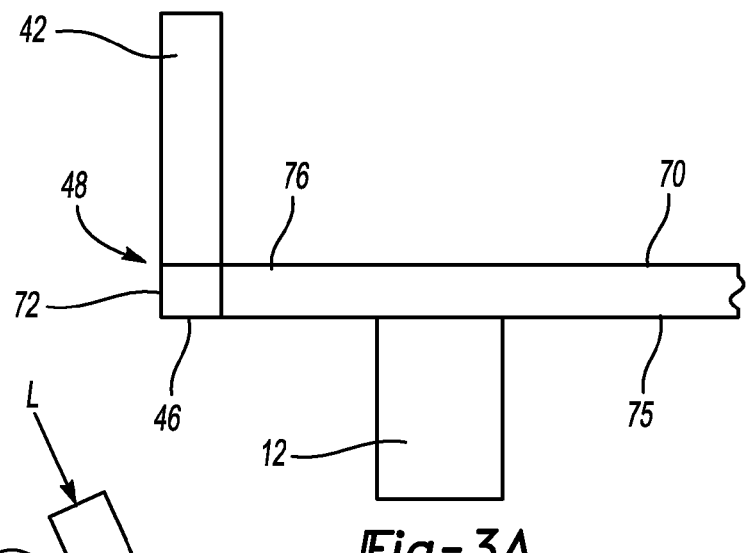
FIG. 3A shows a pillar-rear sill joint with no external load on the pillar.
Figure 3B:
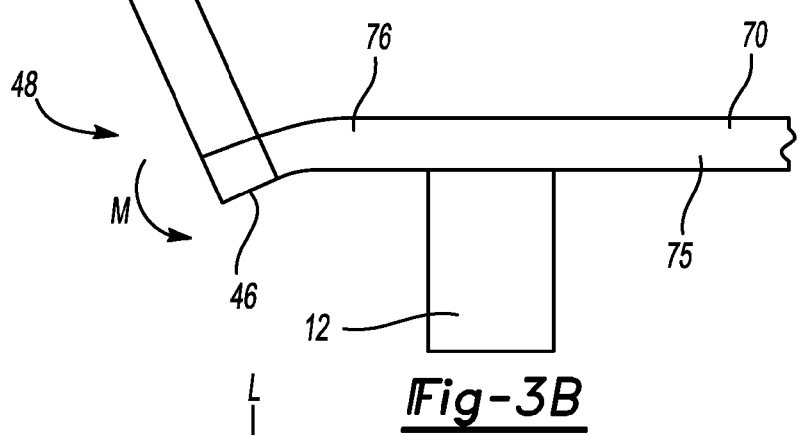
FIG. 3B shows the pillar-rear sill joint with external loading on the pillar and illustrates possible joint deformation caused by the external loading.
Figure 3C:
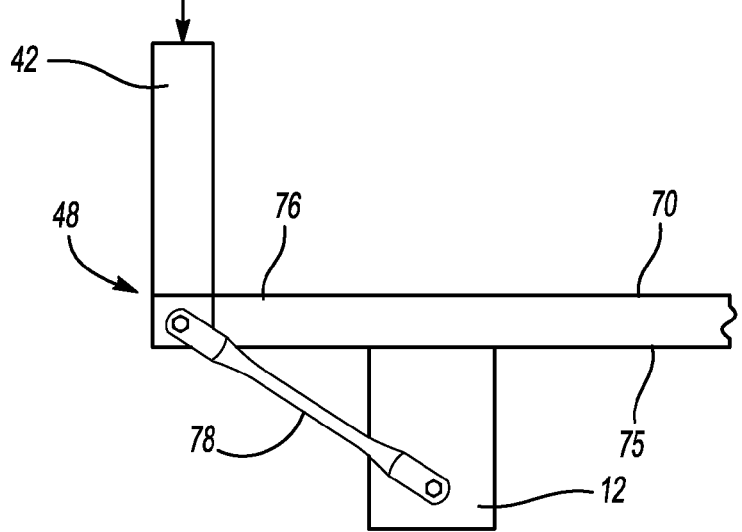
FIG. 3C shows a pillar-rear sill joint that includes a brace.

The sidewalls 24, 26 may experience loading during certain conditions. For example, the sidewalls may experience loads from toolboxes, ladder racks, tie-downs and other things. At least a portion of these loads are transferred from the sidewalls to the frame rails 12, 14 through the pillars 42, 50 and the rear sill 20. FIGS. 3A-3C illustrate detail views of the arrangement of the first pillar 42, rear sill 20 and frame. Other components are removed for clarity. The second pillar 50, rear sill 20 and frame may have a similar arrangement. The rear sill 20 includes an intermediate portion 70 and an end 72. The intermediate portion 70 is attached to the frame rail 12 at a bottom surface 75 of the rear sill 20. The rear sill 20 may be directly attached to the frame rail 12 or additional bracketry may be used to facilitate the connection. The rear sill 20 includes a cantilever portion 76 defined between the frame connection and the end 72. The cantilever portion 76 may include a reinforcement plate to strengthen the cantilever portion. The bottom end 46 of the first pillar 42 may be attached to the end 72 of the rear sill 20 forming a first joint 48.

FIG. 3A illustrates the sidewall 24 and pillar 42 with no external loading. When the pillar 42 is unloaded, the cantilever portion 76 experiences no deflection and is substantially parallel with the rest of the rear sill 20. FIG. 3B illustrates the pillar 42 with a vertical external load L. The vertical external load L is transferred through the pillar 42 into the rear sill 20 through the joint 48. The load L creates a moment M in the cantilever portion 76. Under heavy loading, the moment M can cause the cantilever portion 76 to deflect downwardly. Deflection of the cantilever portion 76 may cause the pillar 42 to bow outwardly beyond a tolerable range.

The amount of deflection of the cantilever portion 76 is a function of the magnitude of the load L and the bending strength of the rear sill 20. The strength of the rear sill 20 varies depending upon material type, material gauge and other parameters. Assuming a constant design load, the rear sill 20 may achieve a desired deflection tolerance by optimizing the material type, gauge and geometry to achieve sufficient bending strength. Rear sill strength is only one consideration in the design process and the rear sill material and gauge choice must be balanced with other objectives, such as reduced vehicle weight. For example, increasing the gauge of the rear sill may increase the bending strength of the rear sill. However, increasing the gauge also increases the weight of the rear sill and may not provide the desired weight savings.

FIG. 3C illustrates one embodiment for providing a lightweight rear sill that achieves deflection within the desired deflection tolerance. It this embodiment, the rear sill 20 and the pillar 42 may be made out of aluminum alloy to reduce weight. The brace 78 provides supplemental compression strength to limit deflection of the rear sill 20. The brace option may have a higher strength to weight ratio as compared to increasing the gauge of the rear sill 20 to achieve desired defection tolerances. This provides a satisfactory solution for increasing the bending resistance of the cantilever portion 76 of the rear sill 20 while reducing the weight of the truck 10.

Figure 4:
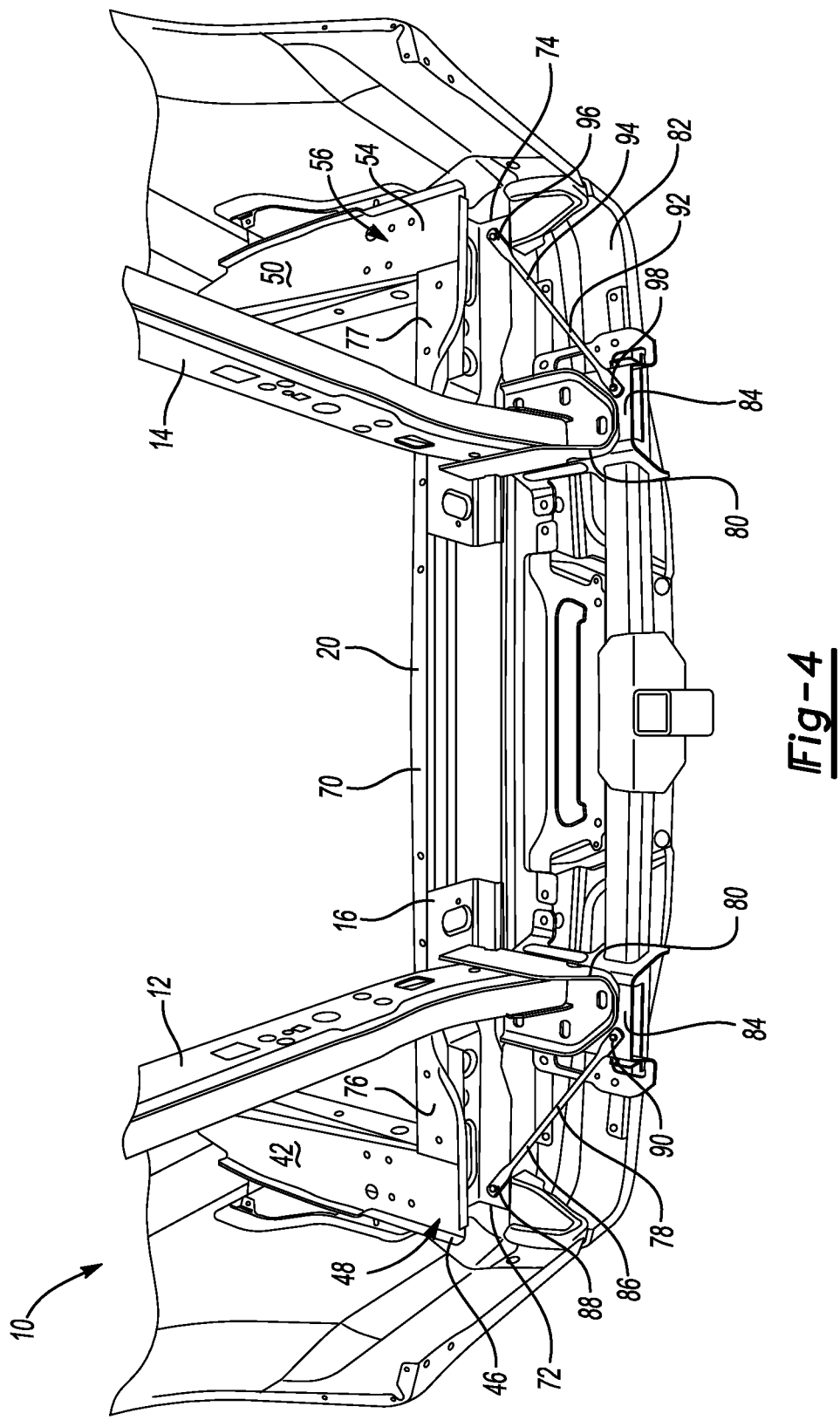
FIG. 4 is a perspective view of a rear portion of the vehicle looking rearward from under the vehicle.

Referring to FIG. 4, a perspective view illustrates a rear portion of the truck 10 looking rearward from under the truck. The truck 10 includes a rear sill 20 having a first end 72, a second end 74 and an intermediate portion 70 therebetween. The rear sill 20 may be attached to a pair of laterally spaced longitudinal frame rails 12, 14. The rear sill 20 includes a first cantilever portion 76 defined between the first end 72 and frame rail 12, and a second cantilever portion 77 defined between the second end 74 and frame rail 14. A first pillar 42 may be attached to the first end 72 of the rear sill 20 at a bottom end 46 of the pillar forming a first joint 48. The second pillar 50 is attached to the second end 74 of the rear sill 20 at a bottom portion 54 of the pillar forming a second joint 56. The pillars and the rear sill may be joined together by rivets, screws, bolts, welding or other conventional methods.

The truck 10 may include a bumper 82 having a pair of bumper brackets 84. Each bumper bracket 84 may be connected to one of the flanges 80 to connect the bumper 82 to the pair of frame rails 12, 14. A first brace 78 may be attached between frame rail 12 and a bottom portion of the bed outboard rail 12. A second brace 92 may be attached between frame rail 14 and a bottom portion of the bed outboard rail 14. The first brace 78 provides compression strength to limit deflection of the first cantilever portion 76 and the second brace 92 provides compression strength to limit the deflection of the second cantilever portion 77 as previously described above with reference to FIG. 3C.

The first brace 78 may include an elongated body 86 having a first end 88 and a second end 90. The ends 88, 90 may include a flat planar surface for engaging with a respective attachment surfaces. The elongated body 86 may have a round cross-section or may have a different shaped cross-section. The elongated body of the round embodiment may have a diameter of 6 to 10 millimeters (mm). The brace may be 400 mm from attachment to attachment. Alternatively, the first brace 78 may be a U-channel stamped section or a C-channel stamped section rather than an elongated body. The brace may be a stamped steel part.

In one embodiment, the first brace 78 may be attached to the first joint 48 at the first end 88 and may be attached to the bumper bracket 84 at the second end 90. The first brace 78 may be attached with conventional fasteners or may be welded. Alternatively, the first end 88 may be attached to the pillar 42 or may be attached to the cantilever portion 76 of the rear sill 20. In another embodiment, the second end 90 may be attached to the flange 80 or may be attached directly to frame rail 12.

The second brace 92 may include an elongated body 94 having a first end 96 and a second end 98. The properties of the second brace 92 are similar to those of the first brace 78 as described above. In one embodiment, the second brace 92 may be attached to the second joint 56 at the first end 96 and may be attached to the bumper bracket 84 at the second end 98. The second brace 92 may be attached with conventional fasteners or may be welded. Alternatively, the first end 96 may be attached to the pillar 50 or may be attached to the cantilever portion 77 of the rear sill 20. In another embodiment, the second end 98 may be attached to the flange 80 or may be attached directly to frame rail 14.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pickup truck comprising:
a frame including a pair of longitudinal rails;
a box including a bed supported by the rails and a pair of opposing sidewalls connected to the bed outboard of the rails, wherein the bed includes a rear sill defining a lower-rear end of the bed; and
a pair of braces, each attached between respective rails and the rear sill at a location outboard the rails.

2. The pickup truck of claim 1 wherein the rear sill is attached to the pair of rails at an intermediate portion of the rear sill, the rear sill having a pair of cantilever portions, each defined between one of the rails and one of the ends of the rear sill, wherein each brace includes a first end attached to a respective rail and a second end attached to a respective cantilever portion of the rear sill to prevent the cantilever portion from bending when a load is applied to the sidewalls.

3. The pickup truck of claim 1 wherein the brace further comprises a linear elongated body.

4. The pickup truck of claim 1 wherein the box is an aluminum alloy.

5. A vehicle comprising:
a frame;
a box supported by the frame and including a pair of opposing sidewalls interconnected at a front end by a headboard, a pair of pillars, each pillar disposed in one of the sidewalls at a rear portion of the sidewall and having a bottom end, and a rear sill attached between the pillars at the bottom end and supported by the frame;
a tailgate pivotally attached between the pillars; and
a pair of braces, each including first and second ends, wherein the first end is attached to the frame and the second end is attached to one of the rear sill and a respective pillar to prevent the pillars from deflecting when a load is applied to the sidewall to ensure proper alignment between the tailgate and the pillars.

6. The vehicle of claim 5 wherein the brace further comprises an elongated body disposed between the first and second ends.

7. The vehicle of claim 5 wherein the second end of the brace is attached to the bottom end of the pillar.

8. The vehicle of claim 5 wherein the second end of the brace is attached to the rear sill.

9. The vehicle of claim 5 wherein the frame further comprises a pair of spaced longitudinal rails and wherein the rear sill is attached to the rails at an intermediary portion of the rear sill, the rear sill having a pair of cantilever portions, each defined between the rails and an end of the rear sill, wherein the second end of each brace is attached to a respective rail and a respective cantilever portion.

10. The vehicle of claim 5 wherein the frame further comprises a pair of spaced longitudinal rails and wherein the second end of each brace is attached to a respective rail.

11. The vehicle of claim 10 wherein each rail has an end and further comprises a bumper bracket attached to the end of the rail and wherein the second end of each brace is attached to the bumper bracket.

12. The vehicle of claim 5 wherein the box is an aluminum alloy.

13. A brace for a pickup truck including a box supported by a frame and having a pillar disposed in a sidewall of the box at a rear portion of the sidewall and a rear sill supporting the pillar and attached to the frame, the brace comprising:
an elongated body including a first end attached to the frame and a second end attached to one of the pillar and the rear sill, wherein the brace is configured to prevent the rear sill from bending when a load is applied to the sidewall.

14. The brace of claim 13 wherein the second end is attached to the pillar.

15. The brace of claim 13 wherein the second end is attached to the rear sill.

16. A pickup truck comprising:
a frame including a pair of longitudinal rails;
a box including a bed supported by the rails and a pair of opposing sidewalls connected to the bed outboard of the rails, wherein the box includes a rear sill having ends and defining a lower-rear end of the bed, and a pair of pillars, each disposed in one of the sidewalls and attached to one of the ends of the rear sill forming a joint; and
a pair of braces, each attached between respective rails and a corresponding one of the joints.

17. The pickup truck of claim 16 wherein the rear sill is an aluminum alloy.

18. The pickup truck of claim 16 wherein each of the longitudinal rails includes a bumper bracket and one end of each of the braces is attached to the bumper bracket.

* * * * *